UNITED STATES PATENT OFFICE 2,648,709

METHYL-CHLORPROPYL FORMAMIDE

Meyer Sletzinger, Forest Hills, N. Y., and Max Tishler, Westfield, N. J., assignors to Merck & Co., Inc., Rahway, N. J., a corporation of New Jersey No Drawing. Original application July 2, 1948, Serial No. 36,803. Divided and this application January 31, 1951, Serial No. 208,841

1 Claim. (Cl. 260—561)

This invention relates to the manufacture of compounds possessing analgesic and anesthetic action. In particular, it is concerned with an improved synthetic method for preparing 2,2-diphenyl - 3 - methyl - 4 - dimethylamino - butyronitrile and with novel chemical compounds useful as intermediates in the preparation of this compound. 2,2 - diphenyl - 3 - methyl - 4 - dimethylamino-butyronitrile is itself an important intermediate in the synthesis of isoamidone, 1-dimethylamino - 2 - methyl - 3,3 - diphenylhexanone-4 and salts thereof. Isoamidone and its salts possess analgesic action and may be used as substitutes for morphine.

This application is a division of application Serial No. 36,803, filed July 2, 1948, now U. S. Patent 2,574,505, and relates, in particular, to the preparation of 1-methylformamido-2-chloropropane, which is utilized as an intermediate in our improved method for the synthesis of 2,2-diphenyl - 3 - methyl - 4 - dimethylamino - butyronitrile.

2,2 - diphenyl - 3 - methyl - 4 - dimethylamino-butyronitrile has been prepared previously by reacting 1-dimethylamino-2-chloropropane with diphenylacetonitrile as described by Schultz et al. (J. A. C. S. 69, 188–189, January 1947). As pointed out by these workers, however, when 2,2 - diphenyl - 3 - methyl - 4 - dimethylamino-butyronitrile is prepared by this procedure, there is obtained, at the same time and mixed with this compound, the isomeric nitrile, 2,2-diphenyl-4-methyl - 4 - dimethylamino - butyronitrile. The latter nitrile isomer constitutes an unwanted by-product since it cannot be converted to isoamidone.

Moreover, the preparation of isoamidone directly from the mixture of isomeric nitriles has not proven feasible. In order to prepare isoamidone, it has therefore previously been necessary to isolate the desired 2,2-diphenyl-3-methyl-4-dimethylamino-butyronitrile from the mixture and this has necessitated a complicated separation procedure which results in a considerable loss of the desired isomer.

It is now discovered that the desired 2,2-diphenyl - 3 - methyl - 4 - dimethylamino - butyronitrile can be prepared by a novel process which does not produce any of the unwanted isomeric nitrile. This improved method thus eliminates the loss due to formation of the by-product isomer and at the same time avoids the need for a complicated separation procedure with its attendant losses of the desired isomer. This novel process is conducted as follows: 1-methylamino-2-propanol (compound 1 below) is reacted with formamide to produce 1-methylformamido-2-propanol (compound 2) which is treated with thionyl chloride to form 1-methylformamido-2-chloropropane (compound 3). This compound is then treated with the reaction product of diphenylacetonitrile and sodamide to produce 2,2 - diphenyl - 3 - methyl - 4 - methylformamido-butyronitrile (compound 4) which is reduced by treatment with formic acid and trioxane (or paraformaldehyde) to form the desired 2,2 - diphenyl - 3 - methyl - 4 - dimethylamino-butyronitrile (compound 5). These reactions may be chemically represented as follows:

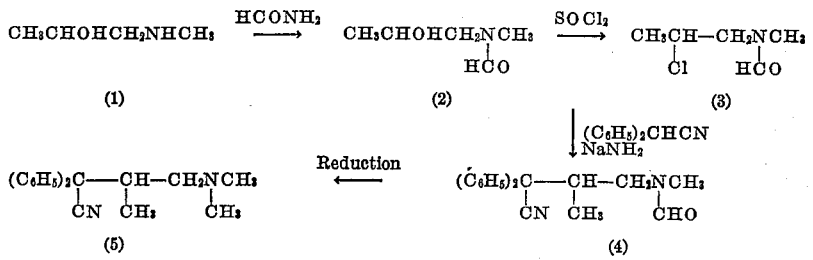

The reaction between the 1-methylamino-2-propanol and the formamide is carried out by heating the reactants together at a temperature of about 100–180° C. The reaction is preferably conducted under reflux, at a temperature of 150–160° C. At this temperature the reaction is ordinarily complete in about 3 hours. The proportion of formamide can be varied over a wide range; for example, amounts varying from equimolecular proportions up to 4 moles of formamide per mole of 1-methylamino-2-propanol can be employed without affecting the yield or quality of the product. Instead of employing an excess of formamide, it is possible to use an excess of 1-methylamino-2-propanol, if desired.

When an excess of formamide is used, the excess formamide is conveniently separated from the reaction mixture by fractional distillation;

the residual 1 - methylformamido - 2 - propanol product (compound 2) may be purified by fractional distillation, if desired. It is ordinarily preferred, however, to employ equimolecular quantities of 1-methylamino-2-propanol and formamide since this procedure makes it unnecessary to separate excess formamide from the 1-methylformamido-2-propanol product; and the material, as produced can be used directly in the following process operation.

The 1-methylformamido-2-propanol, either in pure form or as the crude reaction mixture resulting from the previous procedure described in the preceding paragraph is then reacted with thionyl chloride to produce the desired 1-methylformamido-2-chloropropane. The reaction with thionyl chloride is ordinarily carried out in the presence of a tertiary amine, such as dimethylaniline, or preferably a tertiary heterocyclic amine such as pyridine. If desired, the reaction can be run in solution in a hydrocarbon solvent such as benzene or toluene, or in a hydrocarbon solvent containing said tertiary amine.

The reaction is conducted by adding thionyl chloride dropwise to the solution of the 1-methylformamido-2-propanol in the tertiary amine and/or the hydrocarbon solvent. The rate of addition of the thionyl chloride is adjusted so as to avoid too rapid a reaction and possible overheating of the reaction mixture. The temperature at which the thionyl chloride should be added can vary between wide limits, about 0–75° C., without any variation in the yield of product. After the addition of the thionyl chloride is complete, the mixture is heated at temperature of about 70–100° C. until no more fumes of sulfur dioxide can be detected. The reaction time varies depending on the temperature, but ordinarily the reaction is complete in about 7 to 10 hours.

The reaction mixture is allowed to cool to room temperature and the 1-methylformamido-2-chloropropane recovered therefrom by conventional means. For example, the reaction mixture is shaken with an organic solvent, such as chloroform, benzene, toluene, and the like, and a saturated aqueous solution of an inorganic salt such as sodium chloride, potassium chloride, sodium sulfate, and the like. The non-aqueous layer is then washed with a weakly alkaline aqueous solution such as aqueous sodium bicarbonate solution, aqueous potassium carbonate solution, aqueous sodium carbonate solution, and the like, until neutral. The non-aqueous layer is washed with water, dried and distilled to produce the 1-methylformamido - 2 - chloropropane product (compound 3).

This compound is treated with the reaction product of diphenylacetonitrile and sodamide. The diphenylacetonitrile is mixed with an equivalent molar quantity of sodamide and an inert solvent such as xylene, toluene or liquid petroleum having a boiling point at least about 110° C. The resulting mixture is heated and stirred until the quantitative amount of ammonia has been liberated. The reaction is ordinarily carried out at a temperature of about 105–110° C. under reflux and in the presence of a nitrogen atmosphere.

This reaction mixture is then cooled to about 30° C. and the 1-methylformamido-2-chloropropane is added thereto, preferably dropwise, with stirring. Prior to the addition of the 1-methylformamido-2-chloropropane, it is ordinarily preferred to add a small amount of an ionic iodide, as for example sodium iodide, although the reaction can be carried out, if desired, in the absence of the iodide compound. During the addition of the 1 - methylformamido - 2 - chloropropane the temperature of the reaction mixture rises of its own accord to 35° C., or higher. The resulting mixture is then heated slowly to about 110–115° C. and maintained at this temperature until the reaction is substantially complete. This ordinarily requires about 3 hours. The reaction mixture is then treated with a mixture of water and a water-immiscible solvent. Among the water-immiscible solvents which may be employed are hydrocarbon solvents, such as benzene, or chlorinated hydrocarbon solvents such as chloroform. The layers are separated, the aqueous layer extracted with additional solvent and the non-aqueous extracts are combined, clarified by filtration and evaporated to dryness to produce crude 2,2 - diphenyl - 3 - methyl - 4 - methylformamido-butyronitrile. This product is conveniently purified by recrystallization from ether whereby it is obtained in substantially pure form in a single recrystallization operation. Ether is the preferred solvent for recrystallization of the product since it is selective for the impurities, which are thus left in the mother liquor. Other solvents may be employed if desired, but when using solvents other than ether, it is best to first distill the reaction mixture to remove diphenylacetonitrile and other impurities; the residual material is then taken up in the solvent and crystallized.

As pointed out above, the nitrile product prepared in this way consists only of the desired 2,2-diphenyl - 3 - methyl - 4 - methylformamido-butyronitrile uncontaminated with any isomeric product. This is clearly important in view of the fact that when diphenylacetonitrile is reacted with 1 - dimethylamino - 2 - chloropropane, the product contains both 2,2-diphenyl-3-methyl-4-dimethylamino-butyronitrile and 2,2-diphenyl-4-methyl-4-dimethylamino-butyronitrile.

It is a further advantage of the present invention that this 2,2-diphenyl-3-methyl-4-methylformamido-butyronitrile can be reduced to the corresponding 4-dimethylamino-compound without affecting the nitrile linkage, which is known to be sensitive to reducing agents. This is accomplished by reacting said 2,2-diphenyl-3-methyl - 4 - methylformamido - butyronitrile with formic acid and trioxane. Instead of trioxane, paraformaldehyde may be used although the yields, when paraformaldehyde is used, are somewhat lower.

The mixture of reactants is heated under reflux until the reaction is substantially complete. The end of the reaction is conveniently ascertained by adding a drop of the reaction mixture to an excess of water; when a clear solution results it is an indication that the reaction is complete. The reaction is ordinarily carried out at a temperature of about 97–100° C. The time necessary for complete reaction varies, but at the above temperature, the reaction is usually complete in about 5 days.

The reaction mixture is cooled to 25° C., diluted with water and made alkaline with a strong inorganic base, such as aqueous sodium hydroxide, aqueous ammonium hydroxide, and the like. A white, semi-solid material separates which, on standing, crystallizes completely. This material is recovered by filtration, washed with water and dried to produce 2,2-diphenyl-3-methyl-4-dimethylamino-butyronitrile. Since this material is obtained by reduction of the single isomer 2,2- diphenyl - 3 - methyl - 4 - methylformamido-butyronitrile, it is likewise uncontaminated with any isomeric nitrile material.

The following examples illustrate methods of carrying out the present invention, but it is to be understood that these examples are given by way of illustration and not of limitation.

*Example 1*

89 gms. (1 mole) of 1-methylamino-2-propanol were mixed with 180 gms. (4 moles) of formamide, and the resulting solution was heated to 150–160° C. with stirring and under reflux for about 3 hours. At the end of this time, the reaction mixture was an orange color. The reaction mixture was cooled and fractionally distilled using a Vigreux column. The first fraction was boiled at 63–71° C./1 mm. and weighed 136.0 gms.; $n_D^{23}$=1.4490. This product was practically pure formamide. The second fraction boiled at 71–92° C./0.5 mm. and weighed 14.9 g.; $n_D^{23}$=1.4645. The third fraction boiled at 92° C./0.5 mm. and weighed 94.5 gms.; $n_D^{23}$=1.4665. The total weight of the last fractions was 109.4 gms. and represented a yield of 93% of 1-methylformamido-2-propanol based on 1-methylamino-2-propanol starting material. Anal. Calc'd for $C_5H_{11}O_2N$: C, 51.28; H, 9.40; N, 11.96. Found: C, 51.18; H, 9.64; N, 11.91.

*Example 2*

A mixture of 228 gms. (2 moles) of 1-methylformamido-2-propanol and 158 gms. (2 moles) of pyridine (dried over KOH) was stirred and cooled to 0° C., and 250 gms. (2.1 moles) of thionyl chloride was then added dropwise over a period of 2 hours, during which time the temperature was maintained at 0–10° C. The mass became very thick at the end of the addition, rendering the stirring difficult. After the thionyl chloride had been added the mixture was kept at 0–10° C. for an additional hour. The cooling was then discontinued and the reaction temperature allowed to rise of itself. The temperature reached a maximum of 75° C. The mixture was then heated to 90–100° C. for 7 hours at which time no more fumes of sulfur dioxide could be detected. The reaction mixture was cooled to 30° C., dissolved in 650 cc. of chloroform and washed with three 150 cc. portions of saturated sodium chloride solution. The combined aqueous extracts were washed with 150 cc. of chloroform. The combined organic layers were then washed with 200 cc. of a saturated solution of sodium bicarbonate and then solid sodium bicarbonate was slowly added with stirring until the solution was neutral. The chloroform solution was dried over anhydrous magnesium sulfate, filtered and the chloroform evaporated from the solution to dryness in vacuo. The residual oil was fractionally distilled to produce 171.8 gms. of 1 - methylformamido - 2-chloropropane; B. P. 78° C./2.5 mm.; $n_D^{22.5}$=1.4689; yield approximately 63.3% of theory. This material gave a negative test for ionic halogen when treated in aqueous solution with silver nitrate. Analysis, Calc'd for $C_5H_{10}ClNO$: C, 44.28; H, 7.40; N, 10.33; Cl, 26.15. Found: C, 44.49; H, 7.70; N, 10.28; Cl, 25.88.

*Example 3*

A mixture of 64 gms. (0.72 mole) of 1-methylamino-2-propanol and 33.3 gms. (0.74 mole) of formamide was heated at 150–160° C. with stirring for about 3 hours during which time about 98% of the theoretical amount of ammonia was evolved. The reaction mixture was then cooled to room temperature, and an aliquot of the reaction solution was analyzed by fractional distillation which showed a 92% yield of 1-methylformamido-2-propanol based on 1-methylamino-2-propanol starting material; B. P. 103–124° C./4 mm.; $n_D^{23}$=1.4652.

*Example 4*

32 gms. (0.359 mole) of crude 1-methylformamido-2-propanol prepared as described in Example 3 above, was dissolved in 128 cc. of chloroform and 28.2 gms. (0.357 mole) of pyridine. 44.8 gms. (0.377 mole) of thionyl chloride were added to the above solution over a period of 30 minutes during which time the temperature rose to 60° C. The mixture was then heated under reflux at 73° C. for about 10 hours. The reaction solution was allowed to cool to room temperature and the solution was washed with three 25 cc. portions of saturated sodium chloride solution. The combined aqueous extracts were washed with 25 cc. of chloroform. The combined organic layers were washed with 35 cc. of saturated sodium bicarbonate solution until neutral and then washed with 40 cc. of water. The chloroform layer was dried over 10 gms. of anhydrous sodium sulfate, filtered, and the sodium sulfate washed with 10 cc. of chloroform. The combined filtrate and washes were fractionally distilled in vacuo to produce 40.3 gms. of 1-methylformamido-2-chloropropane; B. P. 139–141° C./58 mm. $n_D^{23}$=1.4693; yield 83% of theory based on the 1-methylformamido-2-propanol starting material. The product showed, upon titrating, 98.5% organic halide with only a trace (0.0004 eq./gm.) ionic halide.

*Example 5*

A solution of 19.3 gms. (0.10 mole) of diphenylacetonitrile in 40 cc. of anhydrous xylene was mixed with a slurry of 3.9 gms. (0.10 mole) of sodamide in 35 cc. of xylene. The resulting mixture was heated and stirred at a temperature of 105–110° C. under reflux and under a nitrogen atmosphere. After 2 hours at this temperature the solid turned a tan color and the quantitative amount of ammonia had been liberated. At this point the temperature was lowered to 30° C. and 0.27 gm. of sodium iodide was added followed by the dropwise addition, over a period of 15 minutes, of 6.8 gms. (0.05 mole) of 1-methylformamido-2-chloropropane. During the addition, the temperature rose to about 35° C. of its own accord. The temperature of the reaction mixture was then raised over a period of 20 minutes to 110–115° C. and the reaction mixture was maintained at this temperature for 3 hours.

The mixture was then cooled to room temperature and extracted with two 45 cc. portions of water. The aqueous extracts were washed with 50 cc. of benzene and the organic extracts were combined, filtered from a small amount of insoluble material and evaporated to dryness in vacuo on a steam bath. The residual material weighing 23.2 gms. was dissolved in 100 cc. of ether and the solution cooled overnight at 5–10° C. The crystalline precipitate which separated was recovered by filtration and dried to produce 8.4 gms. of 2,2-diphenyl-3-methyl-4-methylformamido-butyronitrile; M. P. 127.5–129° C.; yield 57.5% of theory. A sample of this material was further purified by recrystallization from butanol. Analysis, Calc'd for $C_{19}H_{20}ON_2$:

C, 78.08; H, 6.84; N, 9.63. Found: C, 78.31; H, 7.06; N, 9.68.

The mother liquors from the filtration were evaporated to dryness and the resulting residual material was then fractionally distilled at a pressure of 1 mm. About 9.8 gms. of crude diphenyl-acetonitrile distilled at 130–140° C./1 mm. The distillation was stopped when no more distilled at this temperature and the residual material, which weighed 2.7 gms., was dissolved in 20 cc. of ether and the solution cooled overnight at 5–10° C. The crystalline product which separated was recovered by filtration and dried to produce an additional 1.0 gm. of 2,2-diphenyl-3-methyl-4-methylformamido-butyronitrile; M. P. 126–128° C.; total yield was equal to 9.4 gms. which corresponds to 64.3% of theory.

The unreacted diphenylacetonitrile resulting from the foregoing distillation was recovered by slurrying the crude material (9.8 g. M. P. 64–71.5° C.) with 2 cc. of isopropanol and the mixture heated to solution on a steam bath. On cooling this solution, crystals separated which were filtered and washed with 2 cc. of isopropanol and 2 cc. of petroleum ether. The product was dried to produce 7.65 gms. of diphenylacetonitrile; M. P. 71.5–74° C.; this represents a recovery of 58% of the unreacted diphenylacetonitrile.

*Example 6*

2 gms. of trioxane, 6 gms. 98–100% formic acid and 5.84 gms. (0.02 mole) of 2,2-diphenyl-3-methyl-4-methylformamido-butyronitrile were heated under reflux (temperature of the mixture 97–100° C.) for 112 hours. At the end of this time a drop of the reaction mixture, when added to an excess of water, gave a clear solution indicating complete reaction. The reaction mixture was cooled to 25° C. and poured into 100 cc. of water. The aqueous solution was then made basic with aqueous ammonium hydroxide whereupon a white semi-solid material separated which, on standing overnight, crystallized completely. The crystalline precipitate was filtered and washed with water and dried to produce 5.1 gms. of 2,2-diphenyl-3-methyl-4-dimethylamino-butyronitrile; M. P. 63–64.5° C.; yield 91% of theory. The nitrile can be further purified, if desired, by recrystallization from isopropanol-petroleum ether. The nitrile after recrystallization melts at about 67° C.

This material was further identified as follows: (a) Mixed M. P. with known sample of 2,2 - diphenyl - 3 - methyl-4-dimethylamino-butyronitrile of M. P. 64–65° C. melted at 63–65° C.; (b) The picrate showed a M. P. of 210–211° C. The mixed melting point of this picrate with known picrate showed no depression of melting point; (c) The infra-red absorption spectrum substantiated the structure.

Various changes and modifications may be made in our invention without departing from the spirit and scope thereof. Insofar as these changes and modifications are within the purview of the annexed claim, they are to be considered as part of our invention.

We claim:

1-Methylformamido-2-chloropropane.

MEYER SLETZINGER.
MAX TISHLER.

References Cited in the file of this patent

UNITED STATES PATENTS

| Number | Name | Date |
|---|---|---|
| 2,204,371 | Loder | June 11, 1940 |
| 2,232,598 | Farlow | Feb. 18, 1941 |
| 2,357,283 | Peters | Sept. 5, 1944 |